United States Patent [19]

Shiozawa et al.

[11] Patent Number: 4,474,442

[45] Date of Patent: Oct. 2, 1984

[54] FILM TRANSPORT METHOD AND APPARATUS

[75] Inventors: Kazuo Shiozawa; Seiichi Isoguchi, both of Hachioji, Japan

[73] Assignee: Konishiroku Photo Industry Co., Ltd., Tokyo, Japan

[21] Appl. No.: 402,724

[22] Filed: Jul. 28, 1982

[30] Foreign Application Priority Data

Aug. 5, 1981 [JP] Japan .................................. 56/123249
Aug. 5, 1981 [JP] Japan .................................. 56/123250

[51] Int. Cl.³ ............................................... G03B 1/12
[52] U.S. Cl. ............................................... 354/173.11
[58] Field of Search ........................................ 354/173

[56] References Cited

U.S. PATENT DOCUMENTS 4,339,187 7/1982 Matsuura et al. .................... 354/173

*Primary Examiner*—Michael L. Gellner
*Attorney, Agent, or Firm*—Jordan B. Bierman; Linda Bierman

[57] ABSTRACT

An automatic film winding mechanism and method generates a series of pulses for each unit movement amount of the film, computes the speed of the film advancing movement, compares the speed to a stored look-up table for determining the precise point at which power to the film drive motor should be shut off, in order to have the advancement of the film come to a complete stop at a predetermined film transport distance. The invention thereby allows the film to be advanced to the exact transport distance regardless of the output and voltage fluctuation of the film drive power source, or of the film variation or load variation of the motor caused by a change in ambient temperature or other conditions.

3 Claims, 7 Drawing Figures

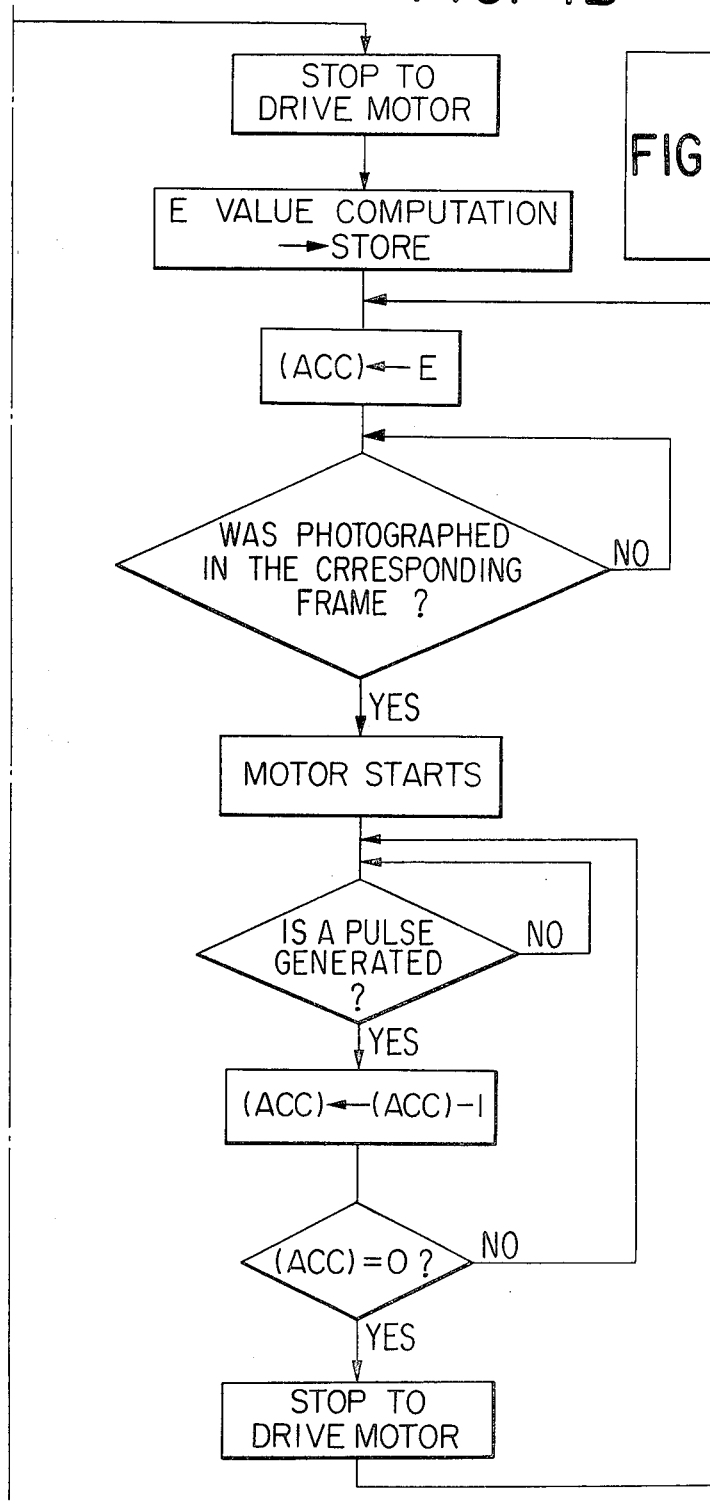

FILM TRANSPORT METHOD AND APPARATUS

BACKGROUND OF THE INVENTION

1. Field of the Invention

The present invention relates to the film transport method and apparatus for transporting accurately one frame equivalent of the film in a camera equipped with an automatic winding mechanism.

2. Description of the Prior Art

Cameras equipped with an automatic winding mechanism have been known in various types and in the transport of one frame equivalent in the conventional camera, the film transport motor has been controlled by the switch that is turned on and off for each winding for one frame of the film. Therefore, the film transport amount has not been constant being influenced by the output and voltage fluctuation of the battery (power source), the film variation and the load variation of the motor caused by the change in ambient temperature and the frame distance on the film has varied, which has been a drawback.

SUMMARY OF THE INVENTION

The present invention has been devised in view of the aforesaid point and there has been realized a film transport method wherein a constant film transport of one frame equivalent can always be made without being influenced by aforesaid factors owing to a film transport method and apparatus characterized in that the film movement amount and the film movement speed are obtained by measuring aforesaid pulses and based upon said movement amount and movement speed, the stop timing for the drive of aforesaid film transport motor is controlled, in a film transport method wherein a film transport motor is controlled for the film transport using a pulse generated for each unit movement amount of a film.

BRIEF DESCRIPTION OF THE DRAWINGS

FIGS. 4, 4A and 4B are a flow chart for the explanation of operation of an example of the present invention

DETAILED DESCRIPTION OF THE PREFERRED EMBODIMENTS

Figure 1:
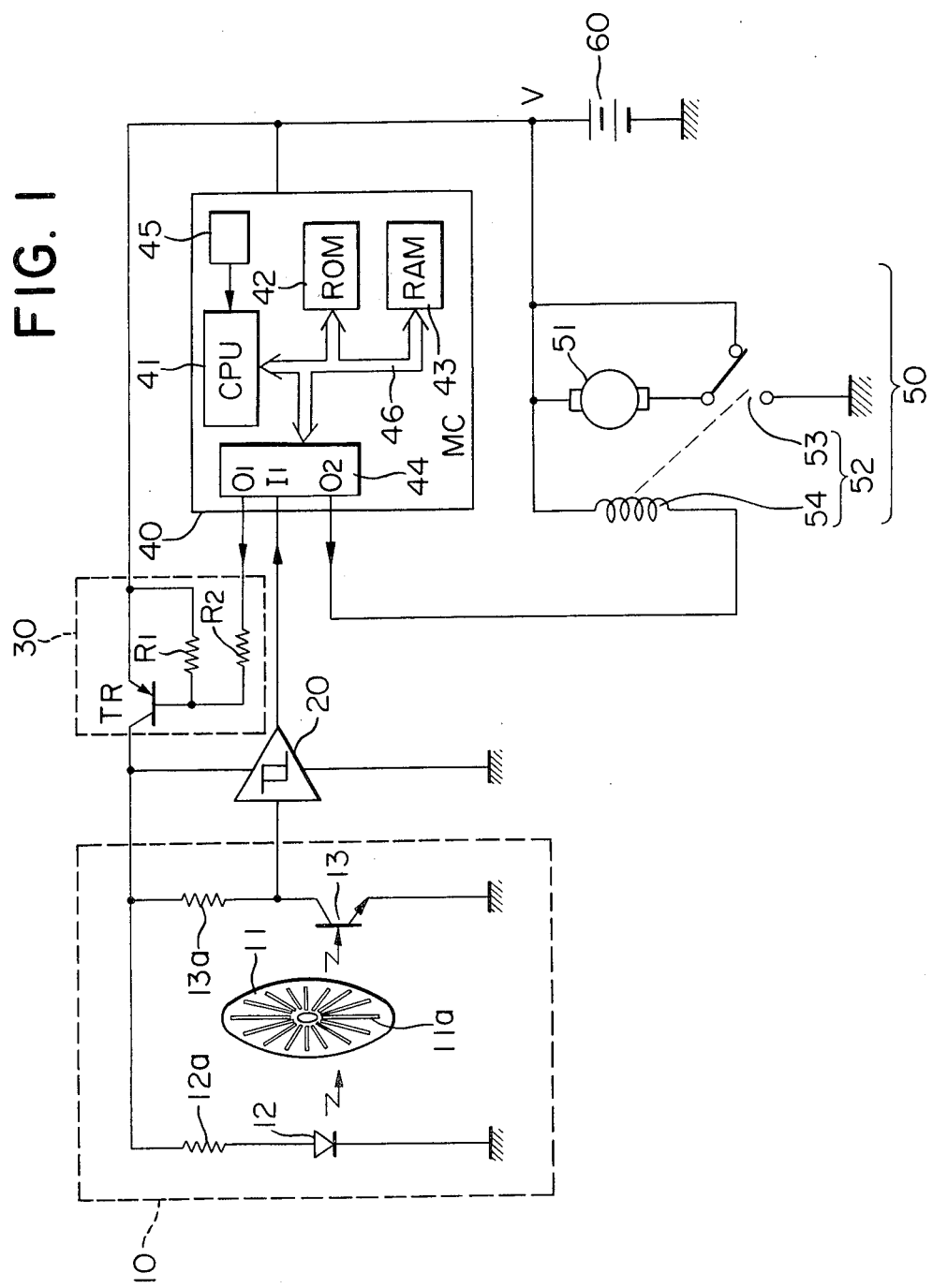
FIG. 1 is an illustration diagram showing an example of the present invention.

The present invention will be explained in detail as follows referring to the drawings.

FIG. 1 is an illustration showing an example of the present invention and 10 is a pulse generator, 20 is a wave-forming circuit, 30 is a switching circuit, 40 is a one-chip microcomputer (hereinafter called MC for short), 50 is a motor-driving circuit and 60 is a battery.

The pulse generator 10 generates the pulse signal for each unit movement amount of the film when winding the film and it consists of the disk (hereinafter referred to as Siemens star) 11 having the slits in the shape of Siemens star and rotates interlocking with a film transport and LED 12 and a phototransister 13 both arranged to face each other with Siemens star 11 locating between them. Siemens star 11 is a disk on which many slits 11a with a uniform pitch are provided in a radial manner and when it rotates, the beam irradiated from LED 12 to the phototransistor 13 is cut intermittently. Incidentally, on LED 12 and the phototransistor 13, the output voltage of the battery 60 is impressed through the resistance 12a and 13a respectively.

Figure 2:
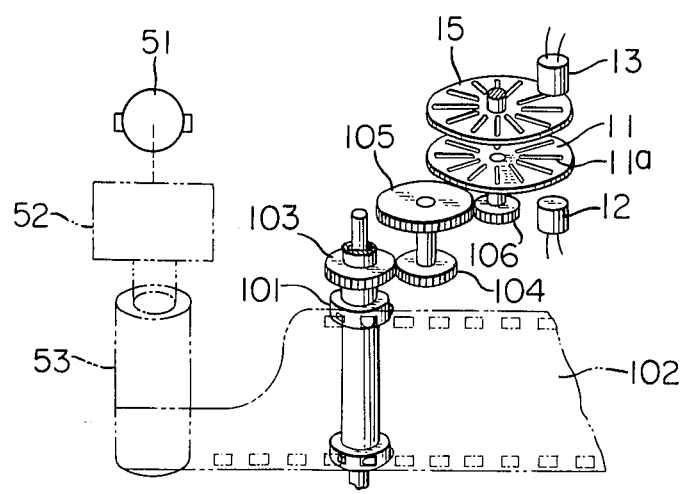
FIG. 2 is an outlined constitution diagram of a mechanical part to rotate Siemens star.

The mechanical part to rotate Siemens star 11 actually is constituted as shown in FIG. 2. Namely, the reel 53 is connected to the output shaft of the film transport motor 51 through the reduction gear train 52, then the film 102 is transported by the rotation of the reel 53, then the sprocket 101 is rotated according to the transport of the film 102 and such rotation is transmitted to the gears 103→104→105→106 which form a multiplying gear, thus the Siemens star 11 embodied with the gear 106 is rotated. Incidentally, the numeral 15 is a fixed Siemens star arranged in a coaxial manner with the Siemens star 11 to get sharp pulse signal. Owing to the aforesaid constitution, the pulse signals are generated from the phototransistor 13 for each unit movement amount of the film 102.

The wave-forming circuit 20 is the one like Schmitt trigger circuit, for example, and it corrects the pulse signals given by the phototransistor 13 to the pulse signal that is suitable for MC 40. The switching circuit 30 is to control the power source to be supplied to the pulse generator 10 and the waveforming circuit 20 in an OFF-and-ON way with controlled signals from MC 40 and it consists of the transistor TR and resistances $R_1$ and $R_2$. On the emitter of the transistor TR, the output voltage V of the battery 60 is impressed and between the base and the emitter, the resistance $R_1$ is connected. Further, the base is connected to the output port $O_1$ of MC 40 through the resistance $R_2$ and when the signal thereof is LOW, the transistor TR is ON and when the signal is HIGH, on the contrary, the transistor TR is OFF.

MC 40 executes a fixed program, reads pulse signals and controls each section and it essentially consists of ROM 42 wherein programs are stored, RAM 43 to store data therein, the central processing unit (hereinafter referred to as CPU) 41 that is a core of control, I/O port 44 for input and output of data and control and the clock oscillator 45 that supplies the clock pulses for CPU 41. Incidentally, CPU 41 conducts, through the BUS 46, delivery and receipt of data and control signals between ROM 42, RAM 43 and I/O port 44. The I/O port 44 usually consists of a register in which information are stored provisionally that is so-called a latch and of an input port and an output port both composed of a decoder to address and select an input/output circuit. The output signal of the wave-forming circuit 20 is introduced to the input port $I_1$ and the output port $O_1$ sends control signals to the switching circuit 30 and the output port $O_2$ sends control signals to the motor-driving circuit 50.

The motor-driving circuit 50 drives the film-transport motor 51 and the current flowing to the motor 51 is cut intermittently by the transfer switch 53 of the relay 52. The switch 53 is controlled in an off-and-on way by the solenoid 54 energized on the relay 52 and it is so arranged that the motor current is cut and a brake is applied on the film transport motor 51 when the switch 53 is turned off.

Figure 3:
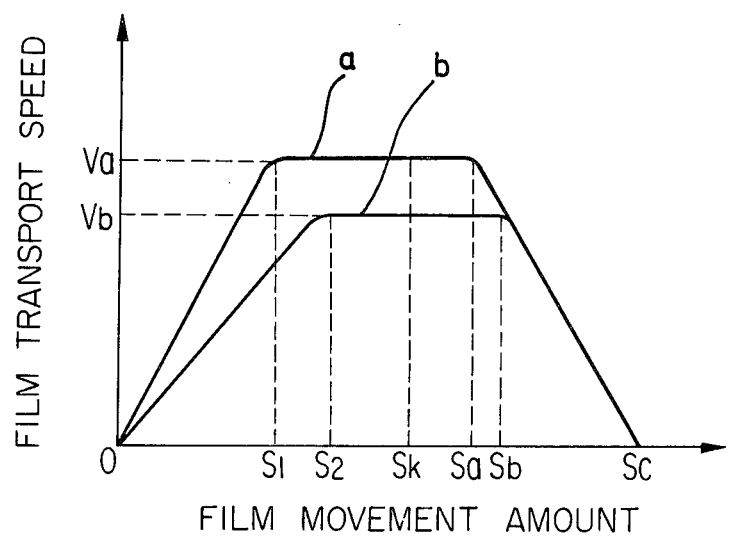
FIG. 3 is a characteristic diagram showing the relation between the film movement amount and the film speed.

The curve "a" in FIG. 3 shows an example of the relation between the film movement amount and the speed. Namely, when the film transport motor 51 is energized, the transport speed ascends and reaches the constant speed Va at the point of movement amount of $S_1$. After that, even if the drive of the film transport motor 51 is stopped at the point of movement amount of Sa, the film stops at the point of movement amount of Sc owing to the overrunning of the film transport motor 51. This overrunning value is nearly proportional to the constant speed Va. The curve "b" in FIG. 3 is a characteristic curve for the exhausted battery and lowered ambient temperature and the movement amount $S_2$ that is required to reach the constant speed and the constant speed Vb are different from those of the curve "a". Therefore, in order to set the film movement amount as Sc, it is necessary to stop the drive of the film transport motor 51 at the point of the movement amount Sb that is different from that of the curve "a". Even with the scatter of the film, the characteristic varies in the same manner as the foregoing. However, in either case, the overrunning amount is in a fixed relation with the constant speed (Va, Vb). In MC 40, therefore, there is stored a corresponding list between the film transport speed and the overrunning amount for the camera in which MC 40 is mounted.

Figure 5:
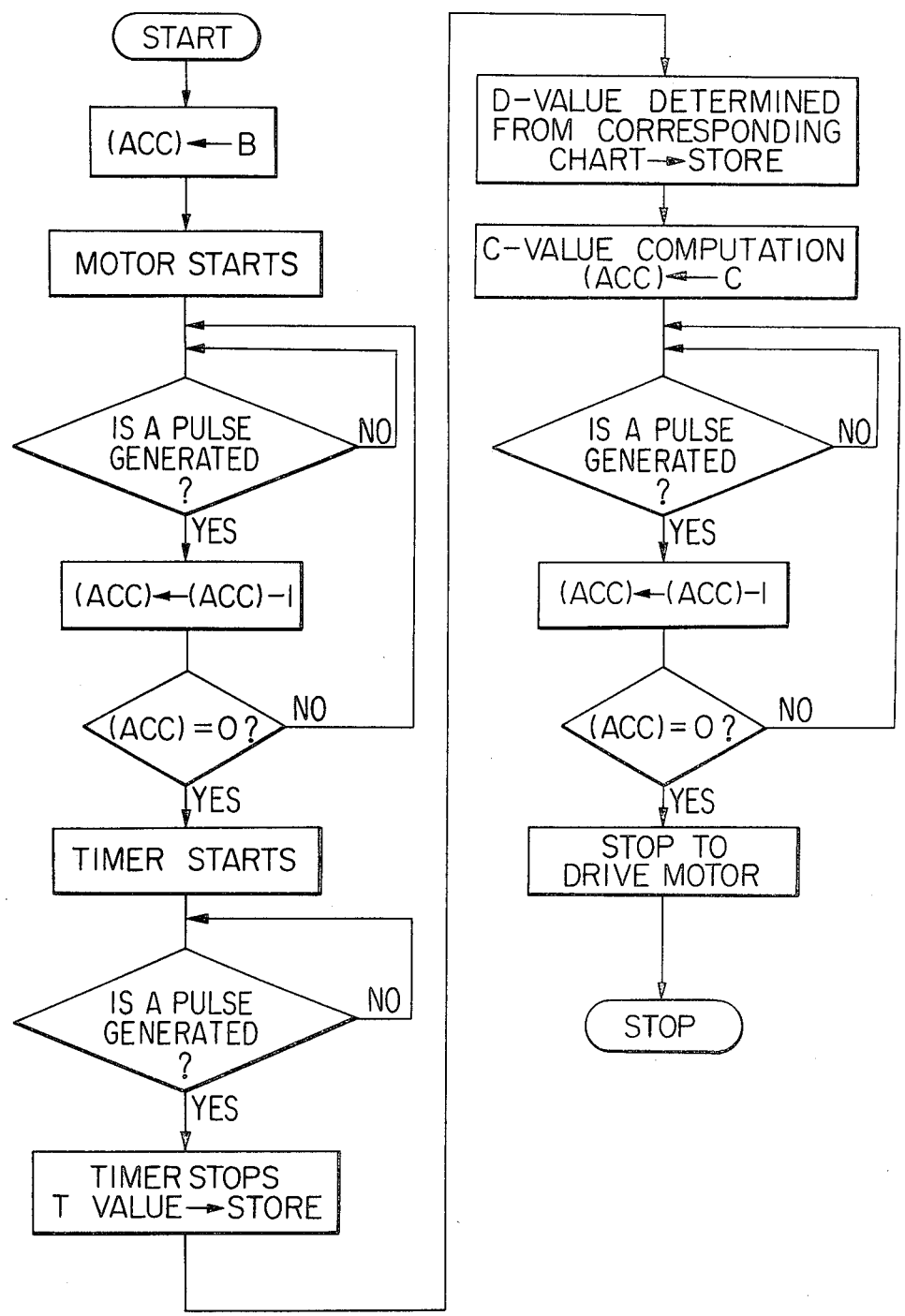
FIG. 5 is a flow chart for the explanation of another example of the present invention.

The operation of the apparatus with aforesaid constitution will be explained as follows referring to the flow chart shown in FIG. 5. The operation starts after the completion of photographing and MC 40 first loads on the accumulator Acc of CPU 41 the fixed pulse number B (e.g. the pulse number corresponding to the movement amount Sk in FIG. 3 which is stored in ROM 42 in advance) being generated until the time when the film transport speed becomes constant fully. Next, the LOW signal is sent out from the output port $O_2$ thereby the solenoid 54 is energized and then the film transport motor 51 is started after the switch 53 is turned ON. Thereby the movement of the film 102 is started and the pulse signals are generated from the pulse generator 10 and they are inputted to the input port $I_1$ of MC 40 through the wave-forming circuit 20. MC 40 detects a rise of the pulse and subtracts 1 from the content (Acc) of the accumulator Acc. After the subtraction, checking is made if the pulse count number has become B, or not, namely, if (Acc) has become 0 or not and if it is equal to or more than b 1, the pulses to arrive again are counted. In the case of (Acc)=0, the built-in timer starts and then the detection of the rise of pulses to arrive next stops the timer. Thereby the interval of pulses T (equivalent to a reciprocal number of Va, Vb) for the constant speed is measured. From this T value, an estimated overrunning amount D which is represented as pulse number is obtained with the usage of the corresponding list between the film transport speed and the overrunning amount and the remaining pulse number C corresponding to the ending moment when the drive of the film transport motor 51 is stopped will be calculated based on the following equation.

$$C = A - B - D - 1$$

where,
A; the pulse number required for the one frame movement amount that is stored in ROM 42 in advance
1; correction value of 1 pulse that corresponds to what is not counted for the measurement of interval of pulses T This value C is loaded on the accumulator Acc and then the subtraction (Acc)−1 is made for each detection of the pulse. Here, the judgment is made on whether (Acc) is equal to zero or not and pulse counting is continued until the time when (Acc) is equal to zero. When (Acc) is equal to zero, HIGH signals are generated from the output port $O_2$, the switch 53 is turned OFF and the drive of the film transport motor 51 is stopped. Thereby, the film transport motor 51 entirely stops after overrunning due to the force of inertia. Being caused by the entire stop of the film transport motor 51, the film 102 also stops. The divergence of the stopping position of the film 102 from the regular stopping position is equal to that of the estimated overrunning amount D from the actual overrunning amount. Incidentally, since the estimated overrunning amount D is obtained from the corresponding list between the film transport speed and the overrunning amount (the corresponding list to be obtained experimentally) in the camera of a certain model, aforesaid divergence is extremely small. Namely, the film 102 stops at almost regular position.

Incidentally, aforesaid example shows the constitution wherein the cycle of the output pulse from the pulse generator 10 is sufficiently large compared with the cycle of the clock pulse of MC 40. In the case the cycle of the output pulse is small and is not sufficiently large compared with the cycle of the clock pulse, however, it is possible to attach the counter to MC 40 or make the counter built in MC 40 and to control the film transport using the pulse obtained by dividing properly the output pulse of the pulse generator 10.

The first frame is set by transporting the film equivalent to three frames (first-frame positioning) and concerning the overrunning amount for transporting the three frames equivalent, it may be stored in advance in MC 40 for the use thereof or 3A in place of A in the equation for calculation of C may be used for the transport control.

Figure 4A:
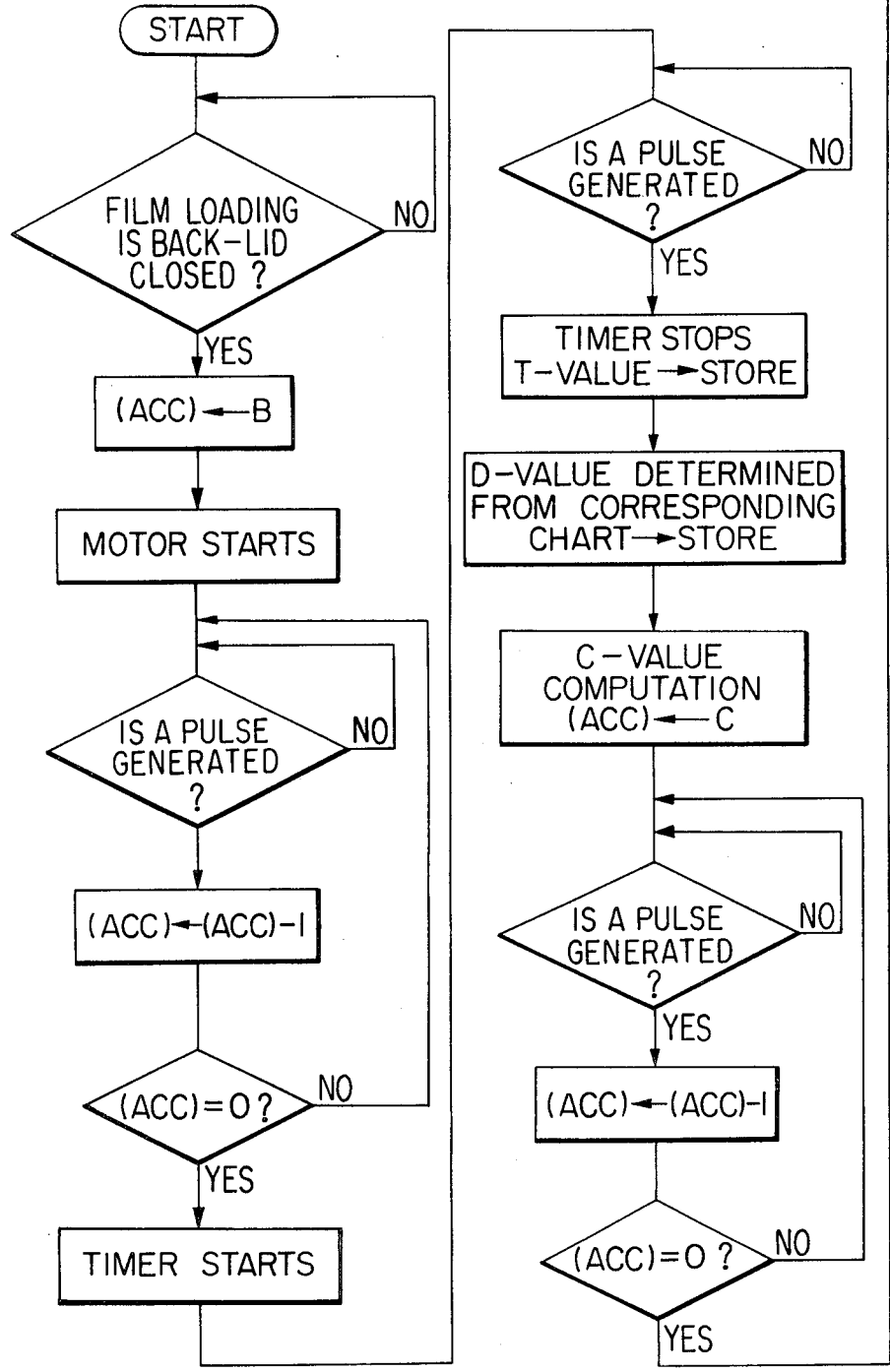

In the case that 3A in place of A in the equation for calculation of C is used for the transport control, the operation of the apparatus will be explained as follows referring to the flow chart shown in FIG. 4 (FIG. 4A + FIG. 4B). In a camera, after loading the film, the winding for first-frame setting corresponding to three frames is made after closing the back lid. In that case, MC 40, after recognizing that the back lid is closed, loads on the accumulator Acc of CPU 41 the fixed pulse number B being generated until the time when the film transport speed becomes constant fully. Next, the LOW signal is sent out from the output port $O_2$ thereby the solenoid 54 is energized and then the film transport motor 51 is started after the switch 53 is turned ON. Thereby the movement of the film 102 is started and the pulse signals are generated from the pulse generator 10 and they are inputted to the input port $I_1$ of MC 40 through the wave-forming circuit 20. MC 40 detects a rise of the pulse and subtracts 1 from the content (Acc) of the accumulator Acc. After the subtraction, checking is made if the pulse count number has become B, or not, namely, if (Acc) has become 0 or not and if it is equal to or more than 1, the pulses to arrive again are counted. In the case of (Acc)=0, the built-in timer starts and then the detection of the rise of pulses to arrive next stops the timer. Thereby the interval of pulses T (equivalent to a reciprocal number of Va, Vb) for the constant speed is measured. From this T value, an estimated overrunning amount D which is represented as pulse number is obtained with the usage of the corresponding list between the film transport speed and the overrunning amount stored in ROM 42 and it is stored in RAM 43. Next, the remaining pulse number C corresponding to the ending moment when the drive of the film transport motor 51 is stopped for the purpose of setting the film at the first frame will be calculated based on the following equation.

$$C = 3A - B - D - 1$$

where,

A; the pulse number required for the one frame movement amount that is stored in ROM 42 in advance 1; correction value of 1 pulse that corresponds to what is not counted for the measurement of pulse distance T This value C is loaded on the accumulator Acc and then the subtraction (Acc)−1 is made for each detection of the pulse. Here, the judgment is made on whether (Acc) is equal to zero or not and pulse counting is continued until the time when (Acc) is equal to zero. When (Acc) is equal to zero, HIGH signals are generated from the output port $O_2$, the switch 53 is turned OFF and the drive of the film transport motor 51 is stopped. Thereby, the film transport motor 51 entirely stops after overrunning due to the force of inertia. Being caused by the entire stop of the film transport motor 51, the film 102 also stops. Accordingly, the first frame of the film 102 is set to be in a standby condition. Under this standby condition, MC 40 calculates E=A−D and stores them. After that, releasing is made and thereby the photographing on the corresponding frame is completed and then E is loaded on the accumulator Acc and the film transport motor 51 is driven in the same manner as the aforesaid occasion. Namely, LOW signals are sent out from the output port $O_2$ and thereby the solenoid 54 is energized and the switch 53 is turned ON to start the film transport motor 51. Hereby, the movement of the film 102 is started and pulse signals are generated from the pulse generator 10 and they are inputted to the input port $I_1$ of MC 40 through the wave-forming circuit 20. MC 40 detects the rise of the pulse and subtracts 1 from the content (Acc) of the accumulator Acc. After the subtraction, checking is made on whether the pulse count becomes E or not, namely, (Acc) becomes zero or not and if it is equal to or more than 1, the pulses to arrive again will be counted. When (Acc) is equal to zero, the drive of the film transport motor 51 is stopped. Hereby, the film transport motor 51 and the film 102 stop after their overrunning. Here, the film 102 stops being caused by the perfect stop of the film transport motor 51.

With a method of the present invention, as explained above, it is possible to transport the film by one frame without being influenced by the voltage fluctuation of the battery, the variation in various types of films and the load variation of the motor caused by the change in ambient temperature and others. Therefore, the frame distance is always constant.

What is claimed is:

1. In a film transport method wherein a film transport motor is controlled by turning a power source on and off to advance the film, the method comprising;

generating a pulse signal for each unit movement of the film;

measuring the film transport speed by the pulse signals generated over a predetermined period of time from the start of the film movement;

determining the overrunning amount of the film for the measured transport speed in accordance with a predetermined index of film transport speeds and overrunning amounts; and turning off the film transport motor at a time when the film transport movement has reached an amount which corresponds to a predetermined, 1-frame transport distance when said determined overrunning amount of the film is added thereto.

2. A film transport method as set forth in claim 1, wherein an overrunning amount of a film is estimated based upon the transport speed in the winding for first-frame setting made after loading the film in a camera and when advancing a film frame, the driving of aforesaid film transport motor is stopped anticipating said overrunning amount.

3. A film transport appparatus comprising;

(a) a film transport motor, (b) a pulse generating means which generates a pulse signal for each unit movement of film, (c) a pulse counting means which counts number of pulses generated by said generating means from when film transport started, (d) a memory means which stores number of pulses being generated until the time when transport speed becomes constant, (e) means for generating a pulse number which corresponds to overrunning amount of film at the time when said pulse counting means counts the number stored in said memory means, (f) a memeory means which stores a pulse number corresponding to one frame movement of film and (g) a control means which stops said film transport motor at the time when said pulse counting means counts a number of pulse that equales to the number left by subtracting the number generated by said means for generating a pulse number from the number stored in said a memeory means which stores a pulse number correspondding to one frame movement of film.

* * * * *